Jan. 3, 1961   J. A. FERRARA ET AL   2,966,839
BASTING DEVICE

Filed Jan. 28, 1958   2 Sheets-Sheet 1

INVENTORS
James A. Ferrara
BY Vincent J. Ferrante
ATTORNEY

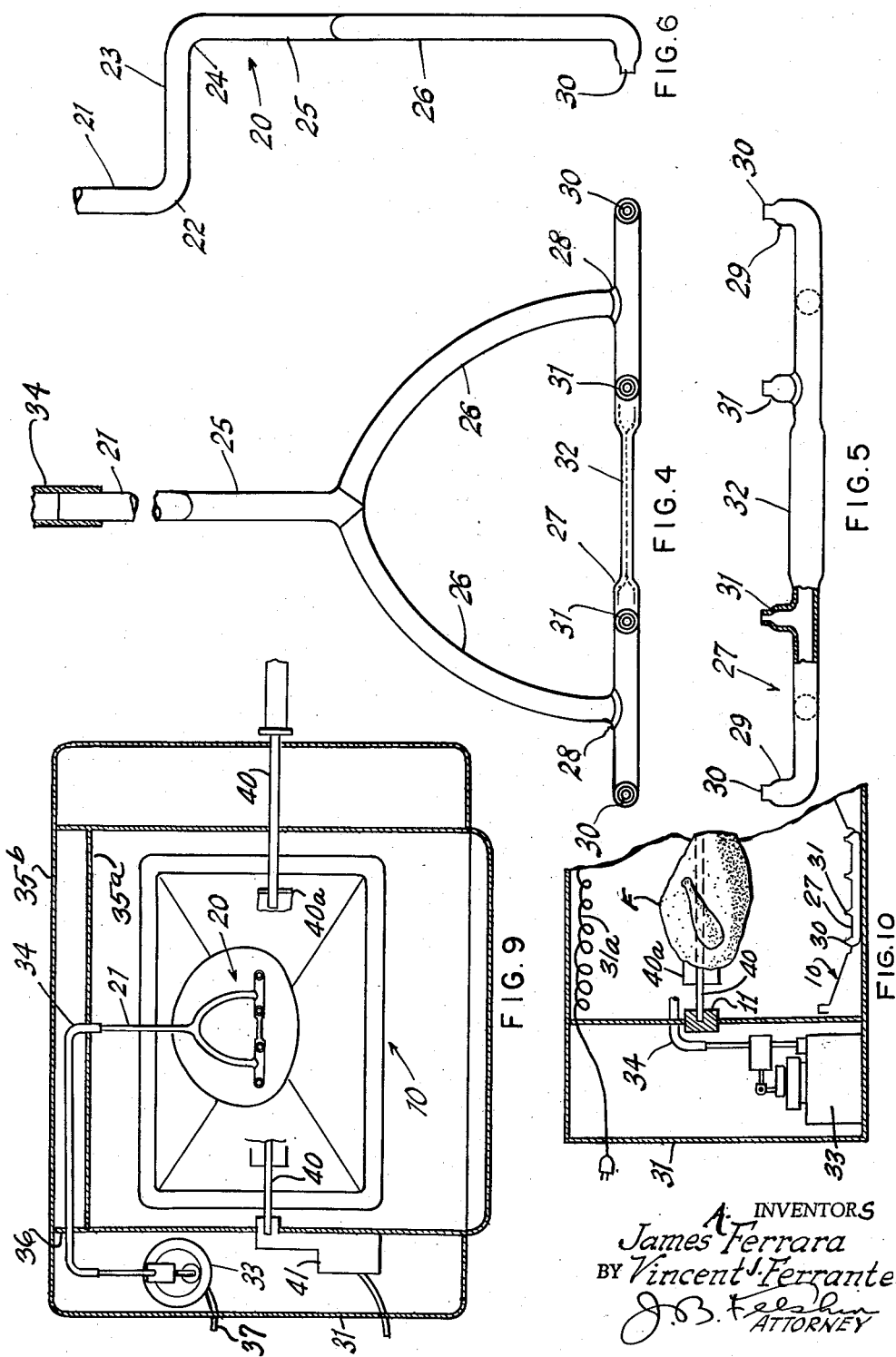

United States Patent Office 2,966,839
Patented Jan. 3, 1961

2,966,839
BASTING DEVICE

James A. Ferrara, 1146 49th St., and Vincent J. Ferrante, 1601 65th St., both of Brooklyn, N.Y.

Filed Jan. 28, 1958, Ser. No. 711,751

12 Claims. (Cl. 99—346)

This invention relates to a basting apparatus and is particularly directed to an automatic apparatus which may be used in conjunction with previously existing roasting ovens and is particularly adapted for use with electric rotisseries.

The invention essentially consists of a motor driven air compressor for supplying air to spray basting juices. A specially designed nozzle to direct the air under pressure from the compressor, and a nozzle tray having means to receive and support the nozzle and a reservoir to catch the juices from the roasting meat or added juices to be sprayed by air from the air nozzle on the tray.

Previous machines for the purpose of basting meats or fowl while cooking have been devised along the general line of pumping the juices from a drain beneath the oven compartment to a faucet above the meat and allowing the juices to shower down upon the piece being cooked. These previous machines are complicated and space consuming, interfering with overhead heating units, difficult to remove and clean, and uneconomical to manufacture.

The introduction to wide-spread use of light-weight table-top electric broilers which contain built-in rotating means for roasting meat on a spit has presented the need for a basting unit which is particularly suited for use with these machines and is equally simple in construction and efficient in use.

One of the several objects of this invention is therefore, to provide a basting apparatus of the type above described, which may be easily combined for use with previously existing electric roasters or which may be built-in to new roasters without substantially increasing the size of the machines.

Another object of this invention is to provide a basting apparatus of the type described which will increase the efficiency of electric roasting machines by saving time in basting, preventing accidents or burning of hands from manual basting, yet which is simple to assemble, and equally easy to detach for cleaning purposes.

It is a further object of this invention to provide a basting apparatus which will operate by using a simple air compressor, thus eliminating the use of complicated fluid pumps and which, by this means, will spray the basting fluid upward as the meat turns, thus providing a gentle moistening of the meat surface rather than a soaking downpour from above.

Other objects, features and advantages of the invention will become apparent from the following description when read with reference to the accompanying drawings.

In the drawings, wherein like reference numerals denote corresponding parts throughout the several views;

In the accompanying drawings:

Fig. 4 is a top plan view of the nozzle means;

Fig. 5 is a front end view of the spraying portion of the nozzle;

Fig. 6 is a side elevational view of the nozzle;

Fig. 9 is a top plan view of the entire apparatus; and

Fig. 10 is a partly sectional view of a portion of the apparatus.

Figure 1:
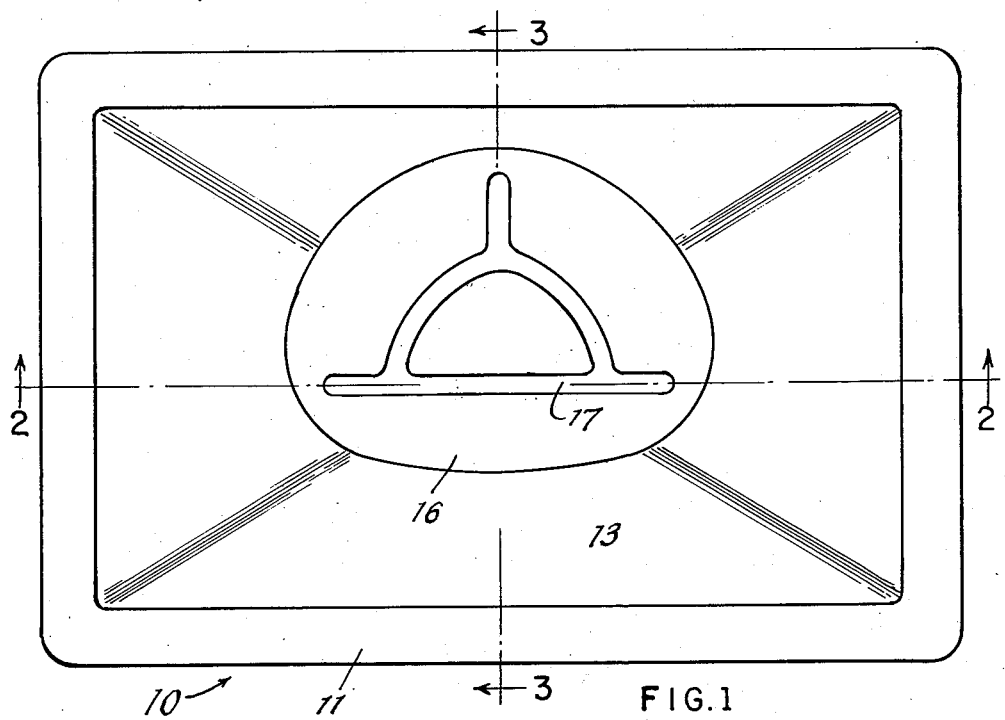
Fig. 1 is a top plan view of the tray portion of the invention.
Figure 2:
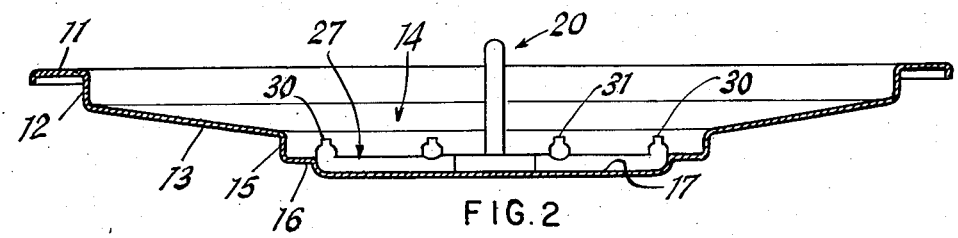
Fig. 2 is a cross-sectional view taken on the line 2—2 of the tray of Fig. 1, with the addition of the nozzle unit.
Figure 3:
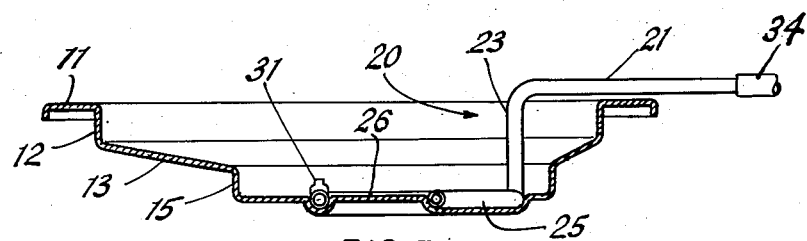
Fig. 3 is a cross-sectional view through the tray and nozzle taken on the line 3—3 of Fig. 1.
Figure 8:
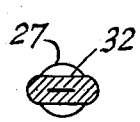
Fig. 8 is a cross-sectional view taken on the line 8—8 of Fig. 7.
Figure 7:
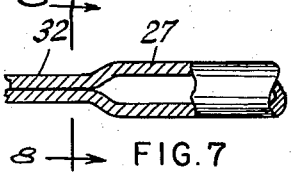
Fig. 7 is a fragmentary cross-sectional view of a portion of the nozzle spraying means.

Referring now to the drawings more in detail, the numeral 10 indicates a tray embodying part of the invention. The tray 10 is formed with a rectangular outer flange 11. A vertical wall 12 projects downwardly from the inner edge of the flange 11. Extending inwardly from the rectangular vertical wall 12 is a downwardly angled flaring wall 13. At the central portion of wall 13, and spaced below the lower edge of wall 12, is a reservoir indentation 14. Reservoir 14 is formed with a descending vertical side wall 15 which encircles the reservoir. Wall 15 is generally shaped to a free form resembling a three-ended ellipse. A bottom wall 16 closes the lower end of the reservoir 14. Embossed in the bottom wall 16 is an indented pattern 17 corresponding to the pattern of the nozzle used in the invention. The entire tray 10 may be made of steel or aluminum and the upper outer flange 11 may be of any standard size so as to fit standard roasting ovens. Drippings from the piece of meat or other food which is heated above the tray will fall onto the inclined wall 13 and run into the reservoir 14.

Figs. 4, 5 and 6 illustrate the nozzle 20. The nozzle 20 is formed of tubular metallic stock of any suitable diameter. At one end is a straight section of tube 21 which is connected to a forced-air supply. The tube 21 has a curved section 22 at its inner end leading to a downwardly projecting straight portion 23. Another curved portion 24 connects to a forwardly extending straight tubular portion 25. Portion 23 of the nozzle is long enough so that the inlet to 21 may overlie the top flange 11 of the tray while the lower forwardly projecting portion 25 can lie on the bottom wall 16 of the tray reservoir 14. The inward end of tube 25 is joined to a pair of outwardly arched tubular members 26, which may be connected by welding to tube 25. An elongated spraying member 27 is connected to the two curved tubular members 26 at joints 28. These joints may also be welded. The spraying member 27 is formed of tubular stock having upwardly curved end portions 29 which are crimped to form pressure spouts 30. Upwardly extending spouts 30 are spaced outwardly of the joints 28. Spaced inwardly thereof are a pair of upstanding crimped pressure spouts 31 which are welded to drilled holes in the top of spraying member 27. The central portion of the spraying member 27 between the inner spouts 31 is crimped flat as at 32, thus preventing air from passing across this section of the tubing.

The indentation 17 in the bottom wall of the reservoir 14 is of a slightly larger diameter than the tubing of which the nozzle is comprised, and it is of the same pattern. Thus the forward portions of the nozzle 20 can be nested in the indentation to provide secure seating on the tray. The liquid level in the tray may rise to the upper end of wall 15 in order to cover spouts 30 and 31.

In Fig. 9 a plan view of a rotisserie 31 is shown illustrating the placement of the tray 10 and the nozzle 20 therein. The rearward portion 21 of the nozzle extends through one partition 35a of the rear wall 35a—35b of the rotisserie 31. A connecting length of plastic or rubber tubing 34 is fitted at one end over the tube portion 21. The other end of the interconnecting tube 34 leads through partition 36 to an air pump 33 which may be located on a table outside of the rotisserie, or within the existing hollow side panels of the rotisserie along with other standard equipment, such as a timer and a thermostat for the heating elements. The rotisserie or oven is provided with an electric heating element 31a, according to standard practice. The pump may be a simple, singlepiston electric motor driven model or any other type provided with a switch 37 for the current. Thus it may be turned on and off intermittently during the cooking process, as necessary.

As the reservoir 14 fills with juices released from the cooking meat, the liquid level will rise above the top of the spray spouts 30 and 31. Thereafter when the air pump is turned on air will be delivered through the tubing 34 to the nozzle end 21 and finally to the spray tips 30 and 31. Air being thus blown upwardly through the liquid will carry the liquid in a spray to the under side of the meat. The basting apparatus is intended for use with roasting machines having a spit 40 and electric or mechanical rotating means 41 for the spit so that while the spray will only reach the underside of the piece to be cooked, the constant turning of the piece will thoroughly coat the entire outer surface thereof. If desired, the reservoir may be filled with a suitable mixture of spices and liquid prior to cooking so as to season the food while basting. In Fig. 10 a chicken or other fowl F is shown supported on the spit 40 and secured by prongs 40a.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

What is claimed is:

1. In combination, an oven, heating means in the oven, said oven comprising a cooking chamber, means in the oven to support food to be cooked, a basting apparatus comprising a tray received within the oven at the bottom of said cooking chamber so as to underlie food on the food supporting means in said chamber, said tray being formed with a depressed reservoir, a nozzle in the reservoir, said nozzle being formed with upwardly pointing air outlets, the upper ends of said outlets being disposed below the upper end of said reservoir, a forced air supply means connected to said nozzle whereby when said reservoir is filled with basting juices the flow of air from said forced air supply means will prevent said basting juices from entering said nozzle and will be directed upwardly, through the basting juices above said air outlets on said nozzle, for spraying said basting juices upwardly onto a piece of food on the supporting means within said cooking chamber.

2. The combination of claim 1, the connection of said nozzle to said air supply means being a disconnectable connection and said nozzle being removably mounted in, and removable from said tray reservoir for cleansing said nozzle.

3. The structure of claim 1, said tray formed with an upper outer flange, a wall extending downwardly from said flange, a flaring wall extending inwardly and downwardly from said first wall so as to form a lowered tray surface, said reservoir being formed at an intermediate portion of said flaring wall, said reservoir comprising a downwardly extending annular side wall and a transverse bottom wall.

4. The structure of claim 3, and an indented groove pattern formed in the bottom wall of the reservoir to receive and position portions of the nozzle and conforming thereto.

5. The structure of claim 3, said nozzle being formed with a portion adapted to overlie the outer upper flange of the tray, a portion extending downwardly from the first portion and into the reservoir portion of the tray, forwardly arched portions connected to the nozzle portion extending into the reservoir, an elongated spraying portion connected across the two forwardly arched portions of the nozzle, said spraying portion being formed of an elongated tube having upwardly turned end portions, upwardly facing spout portions spaced inwardly of the ends of said spraying portion and said upturned ends, and said inwardly spaced spouts being formed with openings of a smaller diameter than the tubular portion of the nozzle.

6. In combination with an oven having heating means and a chamber in which to support food to be cooked, a basting apparatus comprising a tray in the bottom of said chamber to lie beneath the food cooking in said chamber, said tray having a recessed reservoir, a nozzle within the reservoir, said nozzle being provided with a plurality of spaced, upwardly pointed air outlets, the upper ends of the outlets being located below the upper end of the reservoir, means to force air through the nozzle to spray basting juices collected in the reservoir, upwardly, onto the food cooking in said chamber, said nozzle comprising an elongated forwardly extending inlet conduit at the rear of the oven and projecting into the chamber above the tray, a portion extending from said inlet portion downwardly to the bottom of the reservoir, forwardly and outwardly arched portions joined to the lower end of said downwardly extending portion of the nozzle, and elongated aligned portions connected to the forward ends of said arched portions, said elongated portions carrying said upwardly pointed air outlets.

7. The combination of claim 6, said elongated portions being closed at the ends thereof.

8. The combination of claim 6, said reservoir being grooved at the bottom thereof and receiving said arched and elongated portions of said nozzle.

9. A roasting oven comprising an oven chamber, a basting apparatus comprising a reservoir in the bottom of said chamber, said reservoir comprising an imperforate centrally located depressed portion to catch and collect juices from food roasting in said chamber, means in the chamber to support food to be roasted, located directly above the depressed portion of said reservoir so that juices from the roasting food will drop down into said depressed portion of the reservoir, a roasting heater means in the chamber, and spaced above said reservoir, to roast the supported food in the chamber, and air nozzle means in the depressed portion of the reservoir, said air nozzle means comprising nozzles disposed below the upper end of said depressed portion to direct air under pressure supplied to said nozzle means, upwardly through juices collected in the depressed portion of the reservoir and above said nozzles, and thereby spray such juices upwardly against the underside of food roasting in the support means, and whereby upwardly sprayed basting juices may drop back downwardly into the depressed portion of the reservoir.

10. The combination of claim 9, said heater means being located above the supporting means, in the top of the chamber and in position to be disposed directly above food supported on the support means.

11. The combination of claim 9, in combination with means to supply air under pressure to said nozzle means.

12. The combination of claim 9, said nozzles comprising tubular elements having upwardly pointing restricted discharge orifices at their upper ends.

References Cited in the file of this patent

UNITED STATES PATENTS

| | | |
|---|---|---|
| 128,440 | Witzleben | June 25, 1872 |
| 523,400 | Hayward | July 24, 1894 |
| 938,011 | Mieville | Oct. 26, 1909 |
| 1,732,010 | Goodell | Oct. 15, 1929 |
| 1,921,231 | Jourdan | Aug. 8, 1933 |
| 1,965,323 | Taslitt | July 3, 1934 |
| 2,077,907 | Streander | Apr. 20, 1937 |
| 2,301,601 | Wittwer | Nov. 10, 1942 |
| 2,725,062 | Vile | Nov. 29, 1955 |
| 2,750,950 | Inman | June 19, 1956 |
| 2,790,506 | Vactor | Apr. 30, 1957 |